June 13, 1939.  A. PAUL, JR  2,162,029
TRAILER HITCH
Filed Nov. 17, 1937
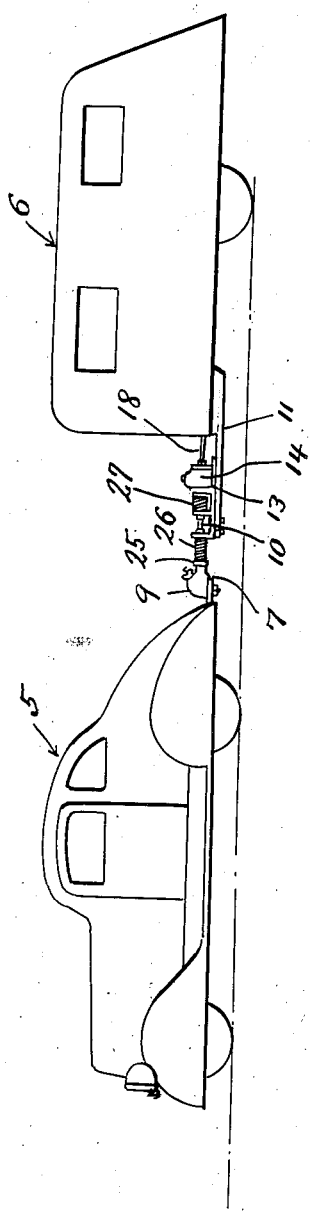
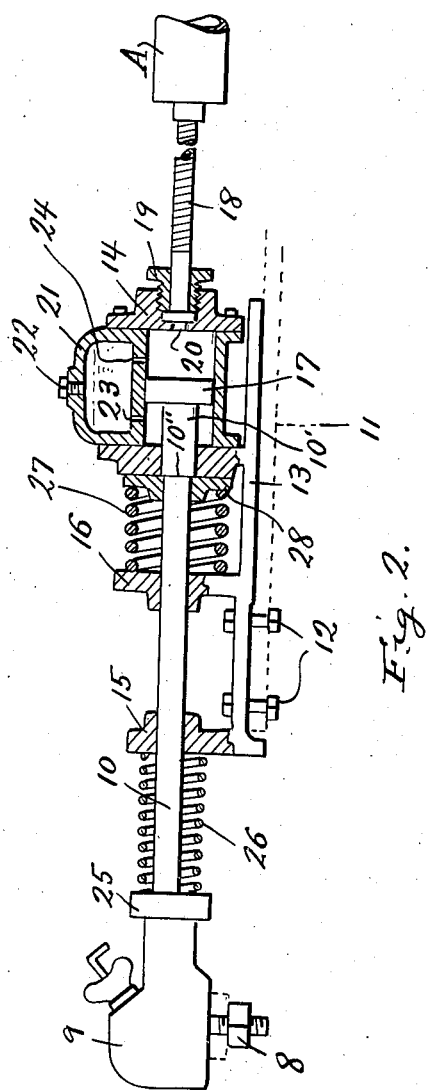
Inventor
Alfred Paul Jr.
By Clarence A. O'Brien
Hyman Berman
Attorneys Patented June 13, 1939

2,162,029

UNITED STATES PATENT OFFICE 2,162,029

TRAILER HITCH

Alfred Paul, Jr., Paul Spur, Ariz.

Application November 17, 1937, Serial No. 175,116

6 Claims. (Cl. 188—112)

This invention relates broadly to trailer hitches and more particularly to a hitch of this character which is so constructed and equipped as to be operative for applying the brakes on a trailer during slowing down of the towing vehicle, or when travelling down steep grades, or under such conditions as would tend toward the trailer over-running the towing vehicle.

A further object of the invention is to provide a combined hitch and braking mechanism embodying certain useful improvements over such combined hitch and brake mechanisms now known or in use.

The invention together with its objects and advantages will be best understood from a study of the following description taken in connection with the accompanying drawing wherein:

Figure 1 is a side elevational view illustrating the application of the invention, and Figure 2 is a detail view, mostly in section of the combined hitch and brake mechanism.

Referring to the drawing by reference numerals it will be seen that 5 indicates generally the towing vehicle and 6 indicates generally the trailer.

The towing vehicle 5 at the rear thereof is provided with a hitch bar 7 to which is bolted or otherwise secured as at 8 a conventional and well-known type of ball and socket joint 9, the ball of which is provided on one end of a rod 10.

At the front thereof the trailer 6 is provided with a draw bar 11 to which is bolted or otherwise secured as at 12 a plate 13 on which is suitably mounted a cylinder 14, and guide bearings 15, 16.

The rod 10 works through the guide bearings 15, 16 and at one end is equipped with a piston 17 that has a working fit within the cylinder 14.

A flexible fluid conduit 18 is connected at one end to the master cylinder A of the hydraulic brake system (not shown) with which the trailer 6 is equipped, and one end of the fluid conduit 18 is coupled as at 19 with one end of the cylinder 14.

At the end thereof to which one end of the conduit 18 is connected thereto cylinder 14 is provided with a port 20 for the passage of fluid therefrom and through the conduit 18 to the master cylinder of the hydraulic brake system of the trailer 6 for applying the brakes under conditions hereinafter more fully pointed out.

Forming a part of the cylinder 14 is a fluid reservoir 21 equipped with a filling plug 22 and also with ports 23, 24 connecting the reservoir 21 with the cylinder 14 at opposite sides of the piston 17.

Disposed on the rod 10 between a fixed collar 25 on the socket of the ball joint 9 and the guide bearing 15 is a low tension spring 26 provided for the purpose of taking up trailer thrust as is occasioned when the vehicles are descending grades.

Also disposed on the rod 10 between one end of the cylinder 14 and the bearing guide 16 is a high tension spring 27, the same being provided to offset the inertia of the trailer when the vehicles are starting into motion.

In this connection it will be noted that on the shaft 10 there is provided a sliding collar 28 against which one end of the coil spring 27 seats, and collar 28, under action of spring 27 is normally urged toward one end of the cylinder 14.

The rear end of the rod 10 is formed with a thickened part 10' which forms a shoulder 10'' at its junction with the major portion of the rod and this shoulder engages the collar 28 to move the collar forwardly against the action of the spring 27 when the piston 17 moves forwardly beyond the position shown in Figure 2.

The utility, advantages and operation of the trailer hitch and brake mechanism will be appreciated from the following:

When the device is attached to the towing and trailing vehicles and a pull is exerted upon the bar 10 the parts will be substantially in the position shown in Figure 2 which will cause the piston 17 to be in a forward position or in a position to the left of port 24 as shown in Figure 2. In consequence there will be no pressure in the cylinder 14 and the brakes of the trailer will be free.

As soon as the trailer moves toward the towing or draft vehicle the bar 13 with guide bearings 15, 16 and cylinder 14 will move forwardly relative to the draw bar 10 from the position shown in Figure 2 towards the left of said figure with the consequence that the piston 17 will be moved towards the port-equipped end 20 of the cylinder so as to compress the liquid therein and to force the same through the conduit 18 to the brakes of the trailer with a consequent application of the brakes of the trailer.

It will be further appreciated that with a device of this character, and by reason of the low tension spring 26 the application of the brakes of the trailer will be readily effected to prevent excessive starting and stopping shocks. Also the inertia of the trailer at moments of starting will be overcome by the high tension spring 27 with the result that the device will be positive and efficient in operation at all times.

It will also be understood that while I have illustrated and described the invention as applied in conjunction with trailers equipped with hydraulic brakes yet, with certain changes, clear to those skilled in the art, the device may be also made applicable to trailers equipped with mechanical brakes.

Having thus described the invention what is claimed as new is:

1. A combined hitch and brake applying device comprising a supporting bar adapted to be mounted on a trailing vehicle, said supporting bar having spaced guide bearings thereon and a cylinder mounted on said bar, a coupling rod slidably working through said guide bearings, a piston on one end of said rod having a working fit in said cylinder, said coupling rod having a free end adapted to be connected with a draft vehicle, a brake applying cylinder for the trailing vehicle and a conduit connected at one end thereof with the first-mentioned cylinder and at its opposite end with the brake applying cylinder.

2. A combined hitch and brake applying device comprising a supporting bar adapted to be mounted on a trailing vehicle, said supporting bar having spaced guide bearings thereon and a cylinder mounted on said bar, a coupling rod slidably working through said guide bearings, a piston on one end of said rod having a working fit in said cylinder, said coupling rod having a free end adapted to be connected with a draft vehicle, a brake applying cylinder for the trailing vehicle, and a conduit connected at one end thereof with the first-mentioned cylinder and at its opposite end with the brake applying cylinder a sliding collar on said coupling rod intermediate one end of said cylinder and one of said bearing guides, and a coil spring disposed about said rod and interposed between said one guide bearing and said sliding collar.

3. In a combined hitch and brake operating mechanism for trailers, a bar adapted to be mounted on the draft bar of a trailer, said bar having guide bearings thereon and a cylinder mounted on said bar, a coupling rod having a working sliding fit through said guide bearings and provided on one end thereof with a piston having a working fit in said cylinder, a ball and socket joint on the free end of said rod and provided with means for connection with a draft vehicle, a light tension spring disposed about said coupling rod and interposed between said ball and socket joint and one of said guide bearings, a high tension spring disposed about said coupling rod and interposed between one end of said cylinder and a second one of said guide bearings, a brake applying cylinder for the trailing vehicle, and a fluid conduit having one end thereof connected with one end of the first-mentioned cylinder and an opposite end thereof connected with the brake applying cylinder.

4. In a combined hitch and brake operating mechanism for trailers, a bar adapted to be mounted on the draft bar of a trailer, said bar having guide bearings thereon and a cylinder mounted on said bar, a coupling rod having a working sliding fit through said guide bearings and provided on one end thereof with a piston having a working fit in said cylinder, a ball and socket joint on the free end of said rod and provided with means for connection with a draft vehicle, a light tension spring disposed about said coupling rod and interposed between said ball and socket joint and one of said guide bearings, a high tension spring disposed about said coupling rod and interposed between one end of said cylinder and a second one of said guide bearings, a brake applying cylinder for trailing vehicle, a fluid conduit having one end thereof connected with one end of the first-mentioned cylinder and an opposite end thereof connected with the brake applying cylinder, a fluid reservoir for said first-mentioned cylinder, and a wall common to said first-mentioned cylinder and said reservoir and provided with a pair of ports connecting the reservoir and first-mentioned cylinder, one of said ports being disposed at one side of said piston and the other of said ports being disposed at a relatively opposite side of said piston.

5. In a combined hitch and brake operating mechanism for trailers, a bar adapted to be connected with a towing vehicle, a bearing member for the bar carried by a part of a trailer, a light spring on the bar between said bearing member and an abutment on the front part of the bar, second and third bearing members on a part of the trailer in rear of the first bearing member and said second and third bearing members being spaced apart, a collar slidably arranged on the bar between the second and third bearing members, said bar having a shoulder thereon engaging the rear face of the collar, a heavy spring on the bar having its front end engaging the second bearing member and its rear end engaging the collar for normally holding the collar against the third bearing member and with the shoulder on the bar flush with the front face of the third bearing member and means for applying the brake operating mechanism of the trailer by the bar when the trailer moves toward the towing vehicle or the vehicle is backed toward the trailer.

6. In a combined hitch and brake operating mechanism for trailers, a bar having one end adapted to be connected with a towing vehicle, a cylinder carried by the trailer, a piston on the rear of the bar located in the cylinder, a reservoir having front and rear ports communicating the reservoir with the cylinder, a conduit connected with the rear of the cylinder, a brake applying cylinder for the trailer connected with the conduit, a collar slidably arranged on the bar, said bar having a shoulder thereon engaging the rear face of the collar, a bearing member through which the bar passes and a spring encircling a part of the bar and having its front end engaging the bearing member and its rear end engaging the collar for normally holding the collar against the front end of the cylinder with the shoulder of the bar flush with the front face of said front end of the cylinder and with the piston between the ports of the reservoir.

ALFRED PAUL, Jr.